United States Patent
Ramesh et al.

(10) Patent No.: US 8,351,080 B2
(45) Date of Patent: *Jan. 8, 2013

(54) LEAST SQUARES BASED COHERENT MULTIPAGE ANALYSIS OF PRINTER BANDING FOR DIAGNOSTICS AND COMPENSATION

(75) Inventors: Palghat Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 718 days.

This patent is subject to a terminal disclaimer.

(21) Appl. No.: 12/555,308

(22) Filed: Sep. 8, 2009

(65) Prior Publication Data

US 2011/0058186 A1 Mar. 10, 2011

(51) Int. Cl.
*G06F 15/00* (2006.01)
(52) U.S. Cl. ........ 358/1.9; 358/1.1; 358/1.14; 358/3.26; 358/3.27; 358/504; 347/247; 347/255; 399/9; 399/167; 399/159; 399/38
(58) Field of Classification Search .................. None
See application file for complete search history.

(56) References Cited

U.S. PATENT DOCUMENTS

| | | | |
|---|---|---|---|
| 4,400,740 A | 8/1983 | Traino et al. |
| 5,165,074 A | 11/1992 | Melino |
| 5,251,058 A | 10/1993 | MacArther |
| 5,519,514 A | 5/1996 | TeWinkle |
| 5,550,653 A | 8/1996 | TeWinkle |
| 5,659,414 A | 8/1997 | Appel et al. |
| 5,680,541 A | 10/1997 | Kurosu et al. |
| 5,818,507 A | 10/1998 | Genovese |
| 5,835,121 A | 11/1998 | Genovese et al. |
| 5,963,244 A | 10/1999 | Metha et al. |
| 6,342,963 B1 | 1/2002 | Yoshino |
| 6,359,641 B1 | 3/2002 | Nacman et al. |
| 6,462,821 B1 | 10/2002 | Borton et al. |
| 6,567,170 B2 | 5/2003 | Tandon et al. |
| 6,621,576 B2 | 9/2003 | Tandon et al. |
| 6,694,109 B1 | 2/2004 | Donaldson et al. |
| 6,760,056 B2 | 7/2004 | Klassen et al. |
| 6,975,949 B2 | 12/2005 | Mestha et al. |
| 7,024,152 B2 | 4/2006 | Lofthus et al. |
| 7,038,816 B2 | 5/2006 | Klassen et al. |
| 7,054,568 B2 | 5/2006 | Mizes et al. |
| 7,058,325 B2 | 6/2006 | Hamby et al. |
| 7,136,616 B2 | 11/2006 | Mandel et al. |
| 7,177,585 B2 | 2/2007 | Matsuzaka et al. |
| 7,492,381 B2 | 2/2009 | Mizes et al. |
| 2003/0063183 A1 | 4/2003 | AuYeung et al. |
| 2006/0077488 A1 | 4/2006 | Zhang et al. |

(Continued)

OTHER PUBLICATIONS

Palghat Ramesh, U.S. Appl. No. 12/555,275, filed Sep. 8, 2009.

(Continued)

*Primary Examiner* — Benny Q Tieu
*Assistant Examiner* — Paul F Payer
(74) *Attorney, Agent, or Firm* — Pillsbury Winthrop Shaw Pittman, LLP

(57) ABSTRACT

A method, system, and computer program product for estimating a banding profile in an image printing system is disclosed. The method includes obtaining image data across multiple measurement intervals by one or more sensors; combining the image data with timing information into a coherent signal by a processor; estimating periodic and aperiodic components of the coherent signal using least squares estimation by the processor, wherein the periodic component represents a banding profile; and wherein at least the periodic component is used to generate an output.

20 Claims, 7 Drawing Sheets

U.S. PATENT DOCUMENTS

| | | |
|---|---|---|
| 2006/0077489 A1 | 4/2006 | Zhang et al. |
| 2007/0052991 A1 | 3/2007 | Goodman et al. |
| 2007/0139733 A1 | 6/2007 | Mizes et al. |
| 2007/0236747 A1 | 10/2007 | Paul |
| 2009/0002724 A1 | 1/2009 | Paul et al. |

OTHER PUBLICATIONS

Palghat Ramesh, U.S. Appl. No. 12/555,287, filed Sep. 8, 2009.
Moritz Patrick Wagner, U.S. Appl. No. 12/190,335, filed Aug. 12, 2008.
R. Enrique Viturro, U.S. Appl. No. 12/112,618, filed Apr. 30, 2008.
Reinsch, Smoothing By Spline Functions, Numeriche Mathematik 10, 1967, pp. 177-183.

LEAST SQUARES BASED COHERENT MULTIPAGE ANALYSIS OF PRINTER BANDING FOR DIAGNOSTICS AND COMPENSATION

CROSS REFERENCES

U.S. patent application Ser. No. 12/555,287 filed on Sep. 8, 2009, entitled "LEAST SQUARES BASED EXPOSURE MODULATION FOR BANDING COMPENSATION," by Ramesh et al.;

U.S. patent application Ser. No. 12/555,257 filed on Sep. 8, 2009, entitled "BANDING PROFILE ESTIMATION USING SPLINE INTERPOLATION," by Ramesh et al.; and U.S. Patent Application Pub. No. 2009/0002724, entitled "BANDING PROFILES ESTIMATOR USING MULTIPLE SAMPLING INTERVALS," by Paul et al.

FIELD

The present disclosure relates to a method, system and computer program product for banding profile estimation for an image printing system.

BACKGROUND

An electrophotographic, or xerographic, image printing system employs an image bearing surface, such as a photoreceptor drum or belt, which is charged to a substantially uniform potential so as to sensitize the surface thereof. The charged portion of the image bearing surface is exposed to a light image of an original document being reproduced. Exposure of the charged image bearing surface selectively discharges the charge thereon in the irradiated areas to record an electrostatic latent image on the image bearing surface corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the image bearing surface, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the image bearing surface. After the electrostatic latent image is developed with the toner particles, the toner powder image is transferred to a media, such as sheets, paper or other substrate sheets, using pressure and heat to fuse the toner image to the media to form a print.

The image printing system generally has two important dimensions: a process (or a slow scan) direction and a cross-process (or a fast scan) direction. The direction in which an image bearing surface moves is referred to as the process (or the slow scan) direction, and the direction perpendicular to the process (or the slow scan) direction is referred to as the cross-process (or the fast scan) direction.

Electrophotographic image printing systems of this type may produce color prints using a plurality of stations. Each station has a charging device for charging the image bearing surface, an exposing device for selectively illuminating the charged portions of the image bearing surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a media. The transferred multicolor image is then permanently fused to the media forming the color print.

Banding generally refers to periodic defects on an image caused by a one-dimensional density variation in the process (slow scan) direction. Bands can result due to many different types of variations within components and/or subsystems, such as roll run out (variations in roll or drum diameter) in a developer roll or photoreceptor drum, wobble in the polygon mirror of the laser raster optical scanner (ROS), and the like. Various sources of banding exist in an image printing system and the frequencies of these sources may be known based on the mechanical design of the image printing system.

For banding diagnostics and compensation, the amplitude and phase of bands may be obtained from measurements. Customer diagnostic techniques include visual inspection of a full page uniform halftone and manual measurement with a ruler. Laboratory techniques include printing a few pages of a uniform halftone target, scanning the print target, and analyzing the individual prints using fast Fourier transform (FFT) and averaging to obtain a mean spectrum. These techniques are useful when several periods of banding occur in a single page and banding sources are quite distinct. However, this techniques are less effective when banding source frequencies are low such that only a few (<2) periods occur within a single page, or if multiple banding sources exist that are close in frequency.

SUMMARY

In an embodiment, a method for estimating a banding profile for an image printing system is disclosed. The image printing system comprises at least one marking engine, the at least one marking engine comprising a charging device for charging the image bearing surface, an exposing device for irradiating and discharging the image bearing surface to form a latent discharged image, and a developer unit for developing toner to the discharged portion of the image bearing surface. The method includes obtaining image data across multiple measurement intervals by one or more sensors; combining the image data with timing information into a coherent signal by a processor; determining periodic and aperiodic components of the coherent signal using least squares estimation by the processor, wherein the periodic component represents a banding profile; and wherein at least the periodic component is used to generate an output.

In another embodiment, a system for estimating a banding profile for an image printing system is disclosed. The system includes a marking engine; a sensor configured to obtain image data across multiple measurement intervals; an exposing device; and a processor. The processor is configured to combine the image data with timing information into a coherent signal, determine periodic and aperiodic components of the coherent signal using least squares estimation, wherein the periodic component represents a banding profile.

In another embodiment, a computer program product, comprising a machine-readable medium having a machine-readable program embodied therein, said machine-readable program adapted to implement a method estimating a banding profile for an image printing system is disclosed. The method includes obtaining image data of images scanned across multiple measurement intervals; combining the image data into a coherent signal; and determining periodic and aperiodic components of the coherent signal using least squares estimation, wherein the periodic component represents a banding profile.

Other aspects, features, and advantages will become apparent from the following detailed description, and the accompanying drawings.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure addresses the issue of banding profile estimation. The present disclosure proposes a method for estimating banding profiles comprising at least three steps. First, image data across multiple measurement intervals is obtained by a sensor. The multiple measurement intervals may be pages, interdocument zones, or customer image zones. The image data may represent print profiles. Second, the image data is combined with timing information into a coherent signal. Third, the coherent signal is analyzed for periodic and aperiodic components using least squares estimation, wherein the periodic components represent a banding spectra, or banding profile. Optionally, an output may be generated based at least on the periodic components.

The method may use timing information of the measurement intervals to construct a coherent signal across multiple measurement intervals that may or may not be sampled consecutively. Since the data in the coherent signal may not be uniformly sampled in time, the proposed method based on Least Squares Estimation may be used to obtain a banding spectra, or banding profile. The banding profile may be obtained for a range of uniformly spaced frequencies or for a set of discrete banding source frequencies and their harmonics. For specific banding frequencies, the once around timing information of the banding source may be used to obtain the phase relationship relative to the once around signal, or the phase relationship may be determined relative to a fixed point in time.

The proposed method is related to the method for banding profile estimation disclosed in U.S. Patent Application Pub. No. 2009/0002724, herein incorporated by reference in its entirety. The proposed method accounts for aperiodic variations such as page-to-page drift, and within page lead edge to trail edge variations such that only true periodic variations are used to obtain the banding profile. Page-to-page printer drift may refer to the drift of output prints from the start of a print job to the end of the print job. Some factors contributing to the drift are fuser temperature transient during warmup, transients in toner charge and toner adhesion state due to changes in ambient temperature, and/or humidity and customer image content (e.g. area coverage). Drift may be a slow phenomenon and may be assumed to cause variation from one page to another but not within a page. Lead Edge to Trail Edge variations may refer to a within page variations of output pages from the start of a page to the end of the page. For example, output prints may be darker at the lead edge each page and lighter at the trail edge each page. Lead Edge to Trail Edge variations are sometimes introduced in transfer and fusing processes.

Figure 1:
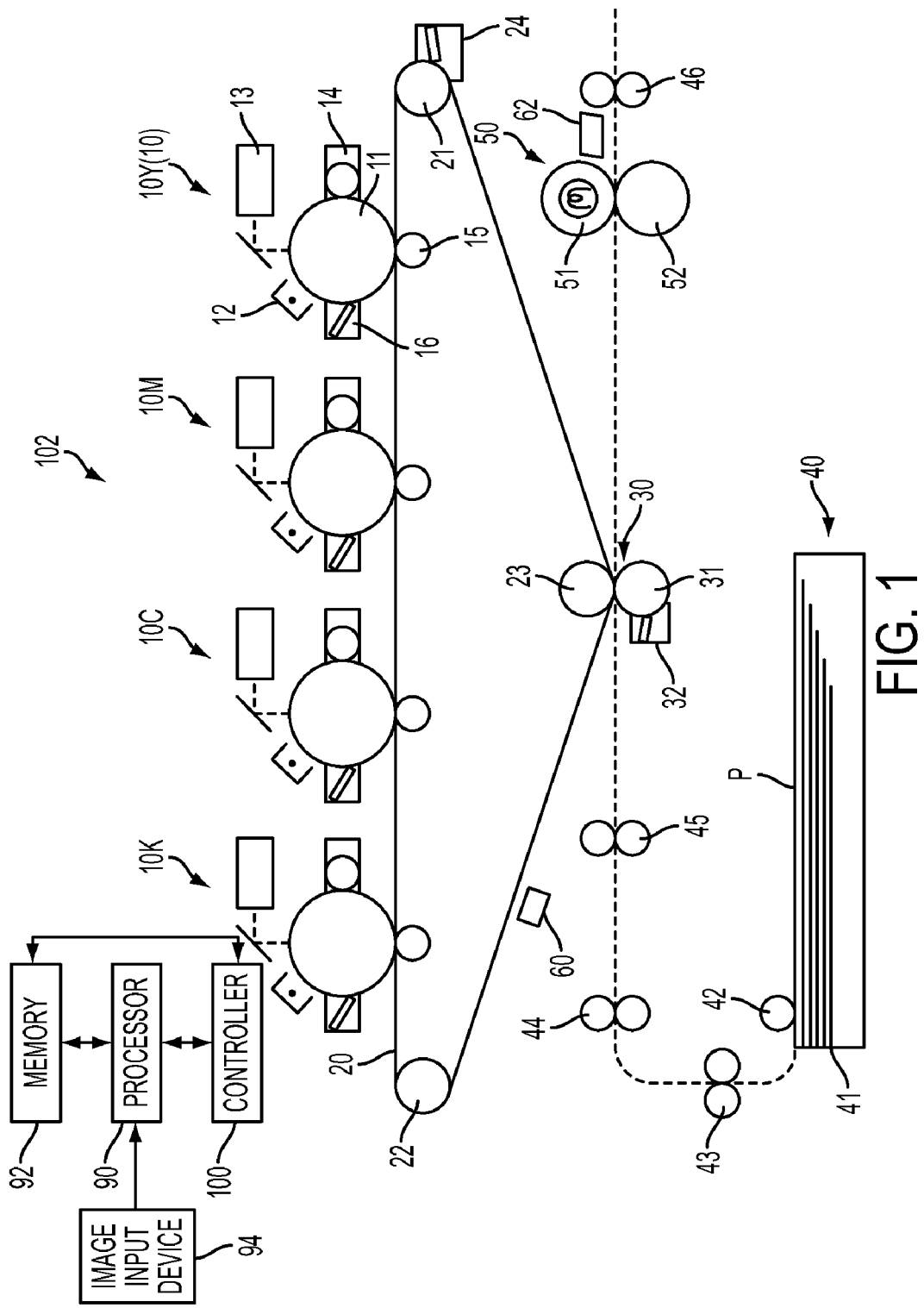
FIG. 1 illustrates an image printing system incorporating an embodiment.

FIG. 1 illustrates a schematic perspective view of an image printing system 102 in accordance with an embodiment. The image forming apparatus includes plural (in this exemplary embodiment, four) marking engines 10, an intermediate transfer belt 20, a secondary transfer device 30, a sheet carrying device 40, and a fixing device 50. The image forming apparatus further includes a controller 100, a processor 90, a memory 92, and an image input device 94. The controller 100 may be provided to control the various elements and sequence of operations of the image printing system 102. In some implementations, the controller 100 and/or processor 90 may be dedicated hardware like ASICs or FPGAs, software (firmware), or a combination of dedicated hardware and software. For the different applications of the embodiments disclosed herein, the programming and/or configuration may vary. The processor 90 may include one processor or one or more sub-processors. Specifically, there is shown an "intermediate-belt-transfer" xerographic color image printing system, in which successive primary-color (e.g., C, M, Y, K) images are accumulated on image bearing surfaces 11. Each image bearing surface 11 in turn transfers the images to an intermediate transfer member 30. However, it should be appreciated that any image printing machine, such as monochrome machines using any technology, machines that print on photosensitive substrates, xerographic machines with multiple photoreceptors, "image-on-image" xerographic color image printing systems (e.g., U.S. Pat. No. 7,177,585, herein incorporated by reference in its entirety), Tightly Integrated Parallel Printing (TIPP) systems (e.g. U.S. Pat. Nos. 7,024,152 and 7,136,616, each of which herein incorporated by reference in its entirety), or ink-jet-based machines, may utilize the present disclosure as well.

The marking engine 10 includes a yellow unit 10Y for forming a yellow image, a magenta unit 10M for forming a magenta image, a cyan unit 10C for forming a cyan image, and a black unit 10K for forming a black image. The yellow unit 10Y, the magenta unit 10M, the cyan unit 10C and the black unit 10K form toner images of respective color components as images, by the electrophotography system.

The marking engines 10Y, 10M, 10C and 10K, which may serve as an image forming section, have the same configuration except colors of the used toner. Accordingly, for example, the yellow unit 10Y will be described below. The yellow unit 10Y includes an image bearing surface 11, a charging device 12, an exposure device 13, a developing device 14, a primary transfer device 15 and a drum cleaner 16. The charging device 12 charges the image bearing surface 11 to a predetermined potential. The exposure device 13 exposes the charged image bearing surface 11 to form an electrostatic latent image. The developing device 14 receives each color component toner (in the yellow unit 10Y, yellow toner) and develops the electrostatic latent image formed on the image bearing surface 11 with the toner. The primary transfer device 15, for example, includes a roll member (primary transfer roll) which is in pressure-contact with the image bearing surface 11 via the intermediate transfer belt 20 with the intermediate transfer belt interposed between the primary transfer device 15 (roll member) and the image bearing surface 11. The primary transfer device 15 applies a predetermined transfer bias between the image bearing surface 11 and the primary transfer roll to primarily transfer the toner image formed on the image bearing surface 11 onto the intermediate transfer belt 20. The drum cleaner 16 removes remaining toner on the image bearing surface 11 after the primary transfer.

The intermediate transfer belt 20, which serves as a recording material, may be disposed rotatably and wound on a driving roll 21, a driven roll 22 and a backup roll 23. Among them, the driving roll 21 may be rotatable, and may stretch the intermediate transfer belt 20 and transmit a driving force to the intermediate transfer belt 20. The driven roll 22 may be rotatable, and may stretch the intermediate transfer belt 20 and may be rotated as the intermediate transfer belt 20 rotates. The backup roll 23 may be rotatable, and may stretch the intermediate transfer belt 20 and may serve as a constituent component of the secondary transfer device 30 as described below. A belt cleaner 24 for removing the remaining toner on the intermediate transfer belt 20 after secondary transfer may be provided so as to face a part of the intermediate transfer belt 20 wound on the driving roll 21.

The secondary transfer device 30 includes a secondary transfer roll 31 that is rotatable and that is in pressure-contact with a surface, on a side where the toner image is carried, of the intermediate transfer belt 20. The secondary transfer device 30 also includes a backup roll 23 disposed on the rear surface of the intermediate transfer belt 20 to form an opposite electrode for the secondary transfer roll 31. A predetermined secondary transfer bias is applied between the secondary transfer roll 31 and the backup roll 23 such that the toner image on the intermediate transfer belt 20 is secondarily transferred onto a sheet of paper P. For example, a roll cleaner 32 for removing the toner transferred from the intermediate transfer belt 20 to the secondary transfer roll 31 is mounted on the secondary transfer roll 31.

Image printing system 102 includes sensors 60 and 62 that are configured to provide image data (e.g., reflectance of the image in the process and/or cross-process direction) to the processor 90. The sensor 60 may be configured to sense images created on the intermediate transfer belt 20 and/or to scan test patterns. Sensor 62 may be configured to sense images created in output prints, including paper prints. It should be appreciated that any number of sensors may be provided, and may be placed anywhere in the image printing system as needed, not just in the locations illustrated.

It should be appreciated that sensors 60 and 62 may be Automatic Density Control (ADC) sensors. For an example of an ADC sensor, see, e.g., U.S. Pat. No. 5,680,541, which is incorporated herein by reference in its entirety. Sensors 60 and 62 also may be a Full Width Array (FWA) or Enhanced Toner Area Coverage (ETAC). See, e.g., U.S. Pat. Nos. 6,975,949 and 6,462,821, each of which herein incorporated by reference in its entirety, for an example of a FWA sensor and an example of a ETAC sensor, respectively. Sensors 60 and 62 may include a spectrophotometer, color sensors, or color sensing systems. For example, see, e.g., U.S. Pat. Nos. 6,567,170; 6,621,576; 5,519,514; and 5,550,653, each of which herein is incorporated by reference in its entirety. It should be appreciated that other linear array sensors may also be used, such as contact image sensors, CMOS array sensors or CCD array sensors.

Image input device 94 (e.g., an input scanner) may capture an image from an original document, a computer, a network, or any similar or equivalent image input terminal. Image input device 94 may send image data to processor 90.

Processor 90 is configured to receive reflectance of the image, or image data, in the process and/or cross-process direction sensed by sensors 60 and/or 62. The processor 90 is configured to generate reflectance profile data and send the data to the controller 100. Processor 90 may also be configured to augment image data with timing data from a signal that is synchronous with the banding source, as disclosed in U.S. Patent Application Pub. No. 2007/0236747, herein incorporated by reference in its entirety. Data received and generated by processor 90 may be stored on memory 92.

The sheet carrying device 40 includes a sheet accommodating section 41, a pickup roll 42, a separation roll 43, a preregistration roll 44, a registration roll 45 and an ejection roll 46. The sheet accommodating section 41 has an opening at its upper part, has a rectangular shape and accommodates the sheet P therein. The pickup roll 42 is provided above the sheet accommodating section 41 to continuously feed an uppermost sheet P of the stack of sheets P accommodated in the sheet accommodating section 41. The separation roll 43 separates and carries the sheets P, which are continuously fed by the pickup roll 42, one by one. The preregistration roll 44 carries the sheet P carried through the separation roll 43 downstream and forms a loop together with the registration roll 45. The registration roll 45 pauses the carrying of the sheet P and resumes the rotation at a predetermined timing so as to feed the sheet P while control the registration with respect to the secondary transfer device 30. The ejection roll 46 carries the sheet P, on which the toner image is transferred by passing through the secondary transfer device 30 and is fused by passing through the fixing device 50, toward a not-shown ejection section.

The fixing device 50 includes a heating roll 51 which has a heating source therein and which is rotatable. The fixing device 50 also includes a pressing roll 52 which is in contact with the heating roll 51 and rotates as the heating roll 51 rotates.

In one embodiment, processor 90 may be configured to obtain timing information and combine timing information with image data. For example, while printing, the page timing information, such as page synchronization signals, and the banding source timing information, such as photoreceptor once-around signals, may be obtained. The page synchronization signal may be a signal internally generated by controller 100 (shown in FIG. 1), for example, as is well known in the art. See U.S. Pat. No. 6,342,963, FIGS. 13A and 13B and corresponding discussion, herein incorporated by reference in its entirety, for examples of page synchronization signals. The page synchronization signal may indicate the leading and trailing edges of a page of an output image. The photoreceptor once-around may indicate the beginning and end of one photoreceptor cycle, wherein a cycle begins and ends at the same point on the photoreceptor. The photoreceptor once-around signal may be generated by an optical sensor or encoder mounted on the rotating shaft of the photoreceptor drum, as is well known in the art. For more details about obtaining timing information and combining timing information with image data, see, e.g., U.S. Patent Application Pub. Nos. 2009/0002724 and 2007/0236747, each of which herein incorporated by reference in its entirety.

For least squares based coherent multipage analysis in accordance with an embodiment, $t_p(p)$ may be the time at the start of page p. $t_p(p)$ may be obtained from a page synchronization sensor, a density sensor, a paper registration sensor, or some other sensor in the printer, such as sensor 60 for example. $t_q(q)$ may be the time at location q in the page from the start of the page. This is equal to $x_q/v$, where $x_q$ is the distance between q and the start of the page and v is the process speed. Thus the time at location q on page p is $tp(p)+tq(q)$. $y(p,q)$ represents a characteristic of a color, including but not limited to luminance, color difference, or scanner grayscale value at location q on page p as measured by an offline or inline spectrophotometer or scanner or density sensor, such as sensors 60 and 62.

A model $\hat{y}(p,q)=g_1(p)+g_2(q)+g_3(p,q)$, where $g_1(p)$ refers to the page-to-page drift, $g_2(q)$ refers to the lead edge to trail edge variation, and $g_3(p,q)$ refers to the variation due to periodic banding sources may be used to describe the color $y(p,q)$. $g_1$ and $g_2$ may be expressed as polynomials:

$$g_1(p) = \sum_{i=0}^{n_1} a_i t_p^i \text{ and } g_2(q) = \sum_{i=1}^{n_2} b_i t_q^i \cdot n_1$$

and $n_2$ may be the order of the polynomial for $g_1$ and $g_2$, respectively. Periodic component $g_3$ may be expressed as $$g_3(p, q) = \sum_{i=1}^{n_3} (c_i \text{Cos}(2\pi f_i(t_p + t_q)) + d_i \text{Sin}(2\pi f_i(t_p + t_q))).$$

$n_3$ may be the number of frequency bins and $f_i$ may the frequency of bin i. Coefficients $a_i$, $b_i$, $c_i$, and $d_i$ may be solved for using Least Squares Estimation:

$$\text{Min}\left[\sum_{p=1}^{P}\sum_{q=1}^{Q}(y(p,q) - \hat{y}(p,q))^2\right]$$

P may be the number of pages and Q may be the number of samples per page. The periodic banding profile for a source frequency $f_i$ is then given by: $b_i(t)=A_i \text{Cos}(2\pi f_i t+\phi_i)$, where the amplitude $A_i$ and phase $\phi_i$ are given by:

$$A_i = \sqrt{c_i^2 + d_i^2}, \phi_i = \arctan\left(-\frac{d_i}{c_i}\right).$$

The solution to least squares estimation may be given by: $A^T Ax = A^T y$, where $$x = \begin{bmatrix} a \\ b \\ c \\ d \end{bmatrix}$$

is the vector of unknown coefficients of length $N=n_1+1+n_2+2n_3$. y is a vector of a measured one-dimensional profile of length M=PQ. A is an M by N matrix with columns $A_i$ where $$A_i = \begin{cases} t_p^{i-1} \text{ for } i = 1 \ldots n_1 + 1 \\ t_q^{i-(n_1+1)} \text{ for } i = n_1 + 2 \ldots n_1 + 1 + n_2 \\ \text{Cos}(2\pi f_{i-n_1-1-n_2}(t_p + t_q)) \text{ for } i = n_1 + 1 + n_2 + 1 \ldots n_1 + 1 + n_2 + n_3 \\ \text{Sin}(2\pi f_{i-n_1-1-n_2-n_3}(t_p + t_q)) \text{ for } i = n_1 + 1 + n_2 + n_3 + 1 \ldots n_1 + 1 + n_2 + 2n_3 \end{cases}$$

$f_i$ can be chosen as a set of uniformly sampled frequencies $f \in [f_{min}, f_{max}]$, where $f_{min}$ and $f_{max}$ are the minimum and maximum frequencies of interest. $A^T$ is matrix A transposed. The number of frequency bins $n_3$ may be chosen such that the condition number of $A^T A > 10^{-5}$. Alternatively, $f_i$ can be chosen as the set of discrete frequencies of known banding sources and their harmonics. Note that the phase $\phi_i$ obtained above is referenced to an initial page synchronization for banding source i. Alternatively, the phase may be references to the banding source itself using a once around timing signal from the banding source.

Figure 2A:
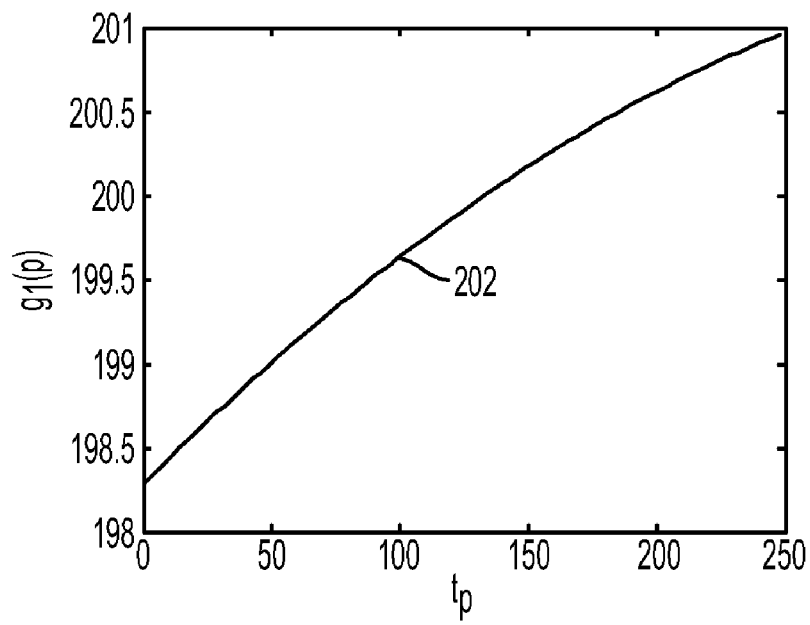
FIG. 2A illustrates a fitted curve representing page-to-page drift.
Figure 2B:
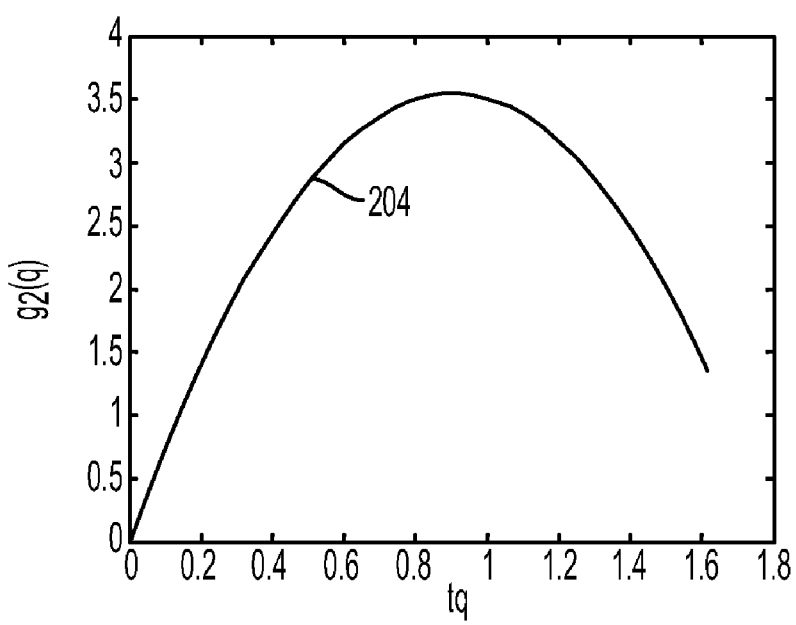
FIG. 2B illustrates a fitted curve representing lead-edge to trail-edge variation.

FIG. 2A illustrates a fitted curve 202 representing page to page drift ($g_1$) for scanner grayscale values across a one-hundred (100) page run. FIG. 2B illustrates a fitted curve 204 representing lead edge to trail edge variation ($g_2$) for scanner grayscale values across the same 100 page run. Fitted curves 202 and 204 were derived based on a data set comprising ADC sensor readings for 100 pages of 50% area coverage Cyan printed by a Xerox DocuColor 250®. The fits shown in fitted curves 202 and 204 assume quadratic forms for the aperiodic components (i.e. $n_1=2$ and $n_2=2$).

Figure 3:
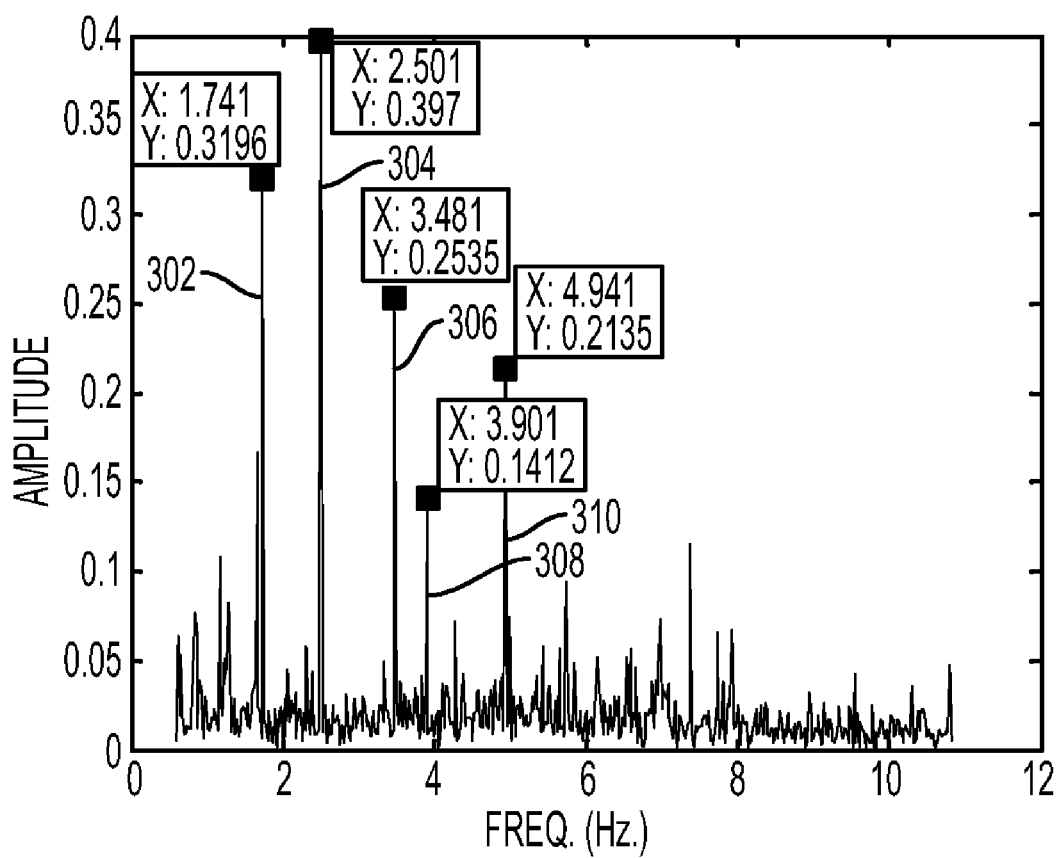
FIG. 3 illustrates a frequency spectra for periodic components, obtained in a frequency range of 0.6 Hz to 10 Hz with 0.02 Hz frequency bins

FIG. 3 illustrates a frequency spectra, or profile, for periodic components, obtained in a frequency range of 0.6 Hz to 10 Hz with 0.02 Hz frequency bins. As shown in FIG. 3, the peaks of the frequency profile are well defined with sharp peaks, unlike ones obtained from single page fast Fourier transforms. The peaks may be more easily matched with known banding sources, such as those shown in Table 1.

TABLE 1

| Freq (Hz) 220 mm/s | Source |
|---|---|
| 1.22 | Black PR (using 188, 1.17 Hz if using 60 mm dia) |
| 1.72 | IBT, Drive (59K32500). Same as CMY PR? |

TABLE 1-continued

| Freq (Hz) 220 mm/s | Source |
|---|---|
| 1.75 | CMY PR |
| 2.00 | Heat Roll |
| 2.24 | Fuser Belt |
| 2.50 | $2^{nd}$ BTR (same as TSTRG 59K32520?) |
| 3.50 | $2^{nd}$ BUR |
| 3.79 | $1^{st}$ BTR for each color |
| 3.89 | Idle Roll? (59K32510) |
| 5.00 | BCR (K Drum) |
| 6.11 | Dev Roller (mag roll) |

For example, a peak 302 at 1.74 Hz. may represent Cyan photoreceptor banding source. A peak 304 at 2.5 Hz may represent a $2^{nd}$ Biased Transfer Roll (BTR) banding source. A peak 306 at 3.48 Hz may represent a $1^{st}$ harmonic of the Cyan photoreceptor banding source. A peak 308 may represent an Idler Roll. A peak 310 at 4.94 Hz may represent a Biased Charging Roll (BCR) banding source. Table 1 may be stored as a look-up table in memory 92. Controller 100 may be configured to reference a look-up table, such as Table 1, stored in memory 92 to determine the sources of potential bands.

Figure 4A:
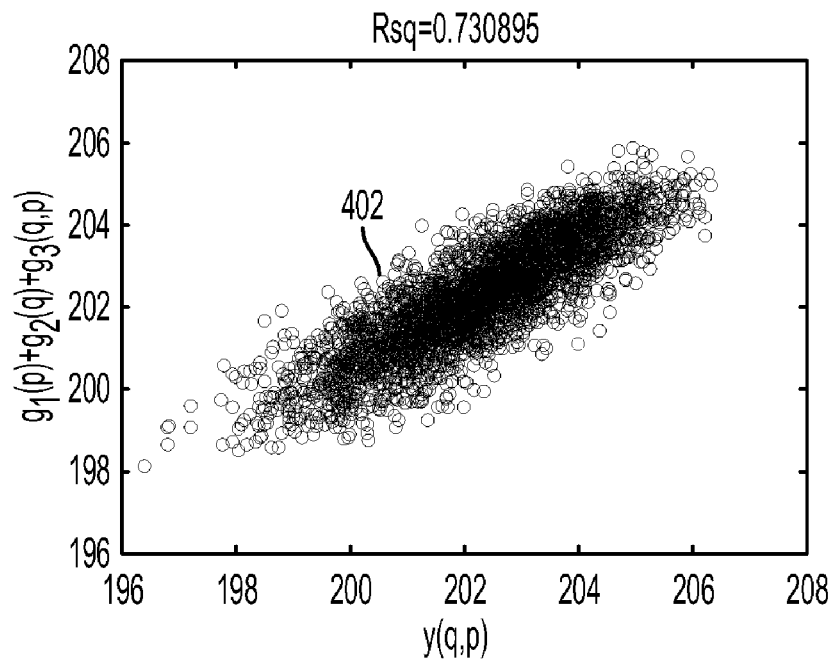
FIG. 4A illustrates a plot of measurement y(p,q) versus fitted model $\hat{y}(p,q)$ for data collected.

FIG. 4A illustrates a plot 402 of measurement y(p,q) versus fitted model ŷ(p, q) for data collected from the Xerox DocuColor 250®. The $R^2$ for plot 402 is 0.73. This indicates that ŷ(p,q) approximately accounts for 73% of the variance in y(p,q) data.

Figure 4B:
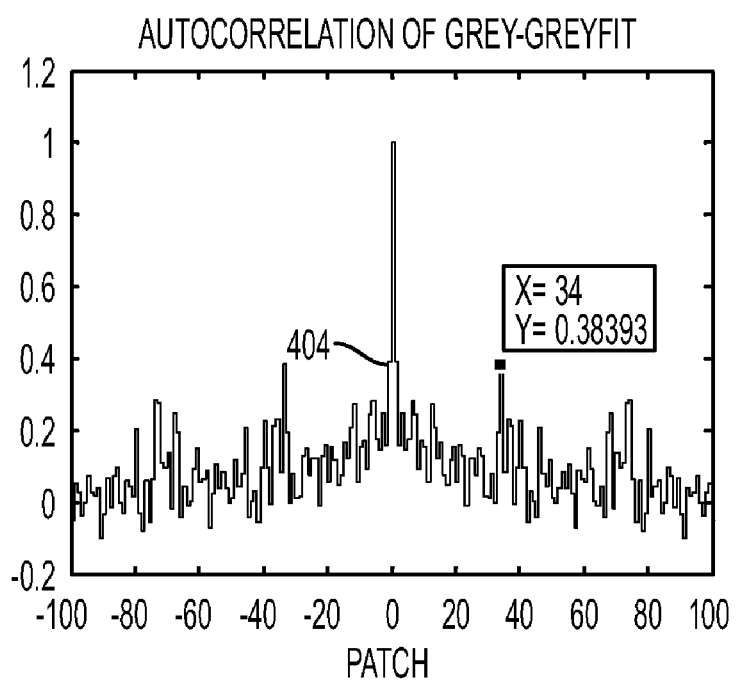
FIG. 4B illustrates an autocorrelation plot of a residual res=y(p,q)−$\hat{y}$(p,q).

FIG. 4B illustrates an autocorrelation plot 404 of a residual res=y(p,q)−ŷ(p,q). For pure white noise, the residual is a delta function. Plot 404 approaches a delta function. Therefore, the fit ŷ(p,q) captures most of the modelable variation.

Figure 5:
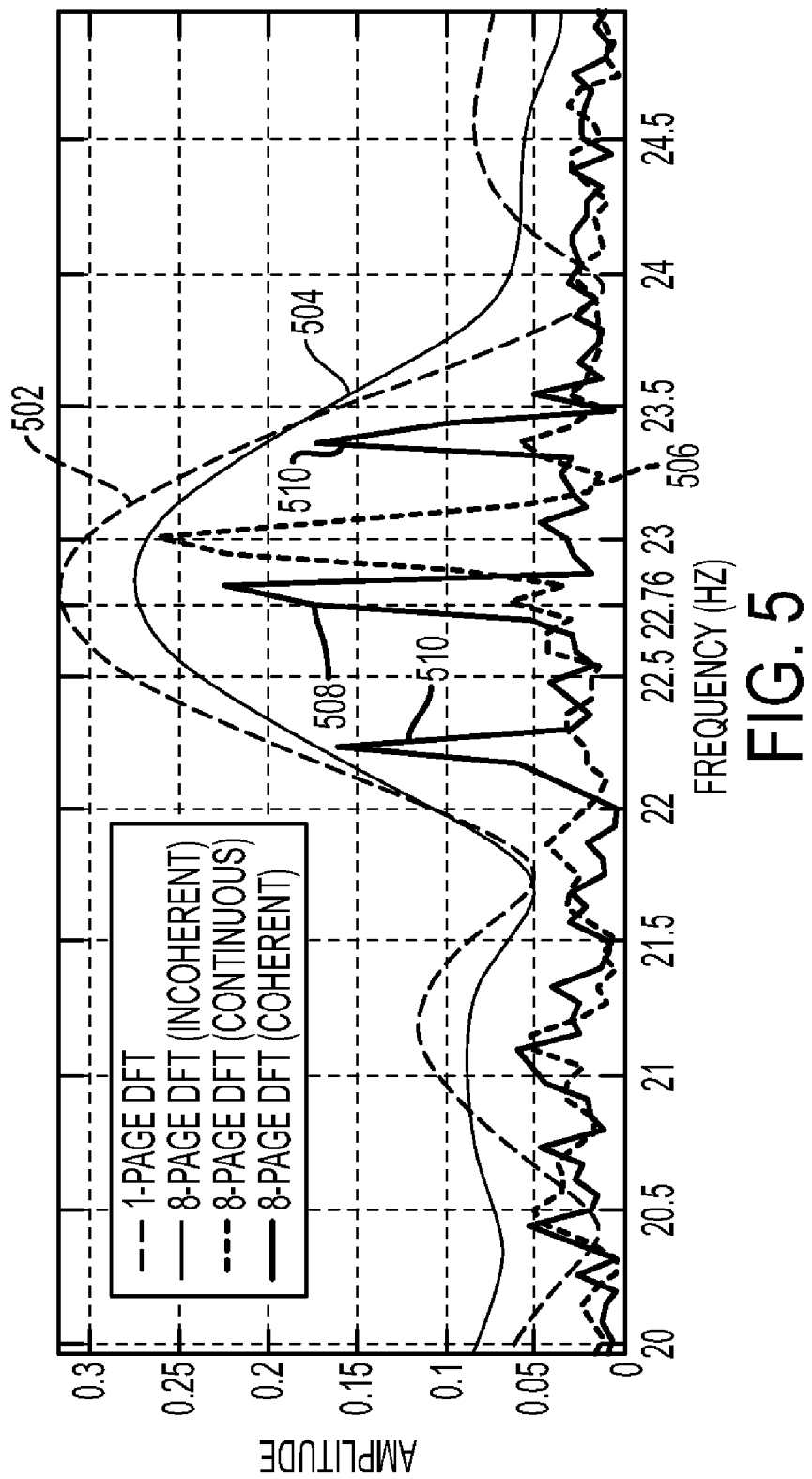
FIG. 5 illustrates results of four different methods of banding profile estimation

FIG. 5 illustrates results of four (4) different methods of banding profile estimation as disclosed in U.S. Patent Application Pub. No. 2009/0002724, herein incorporated by reference in its entirety. The proposed method using least squares based coherent multipage analysis provides advantages over each of the methods of banding profile estimation. As shown in FIG. 5, a banding defect source is a pinion in the photoreceptor drive train for a Xerox Phaser 7750® that results in a banding defect at 22.76 Hz or about 7 mm period on a printed page. Curve 502 shows results from a one-page Discrete Fourier Transform (DFT) method showing a broad peak centered at 22.76 Hz. While the peak is centered at the correct frequency, its amplitude may be difficult to accurately estimate due to the breadth of the peak. In addition, if two sources are close together in frequency, they may be difficult to distinguish. Also, a very low frequency source may be difficult to detect due to having only a few cycles on the single page. Curve 504 shows results from an eight-page incoherent Discrete Fourier Transform (DFT) method is the mean spectra from eight (8) separate one-page DFTs. While its noise may be reduced from that of the one-page DFT, it shares problems such as broad peak and poor frequency resolution. Curve 506 shows results from an eight-page continuous DFT method. Because the eight-page continuous DFT method ignores any gap in the data due to page sample windows, it incorrectly determines the frequency of the banding source. Curve 508 shows results from an eight-page coherent DFT method. The eight-page coherent DFT method produces a sharp peak and thus accurate amplitude estimation and excellent frequency resolution. However, two side lobes 510 are present in the form of two peaks, one before and after the page frequency from the banding source. Side lobes 510 are due to the DFT algorithm itself, as applied to windowed data and cannot be avoided using standard linear frequency transform methods.

If multiple banding sources are present at various amplitudes (which is the much more common situation), the side lobes 510 may make isolating the banding sources and their harmonics more difficult. For the proposed least squares based method of the present disclosure, the results of which depicted in FIG. 3, does not suffer from the side lobe peak problem. Also, banding estimates using the eight-page coherent DFT method may be degraded by aperiodic variations, while the proposed least squares based method is not as susceptible to aperiodic variations.

Figure 6:
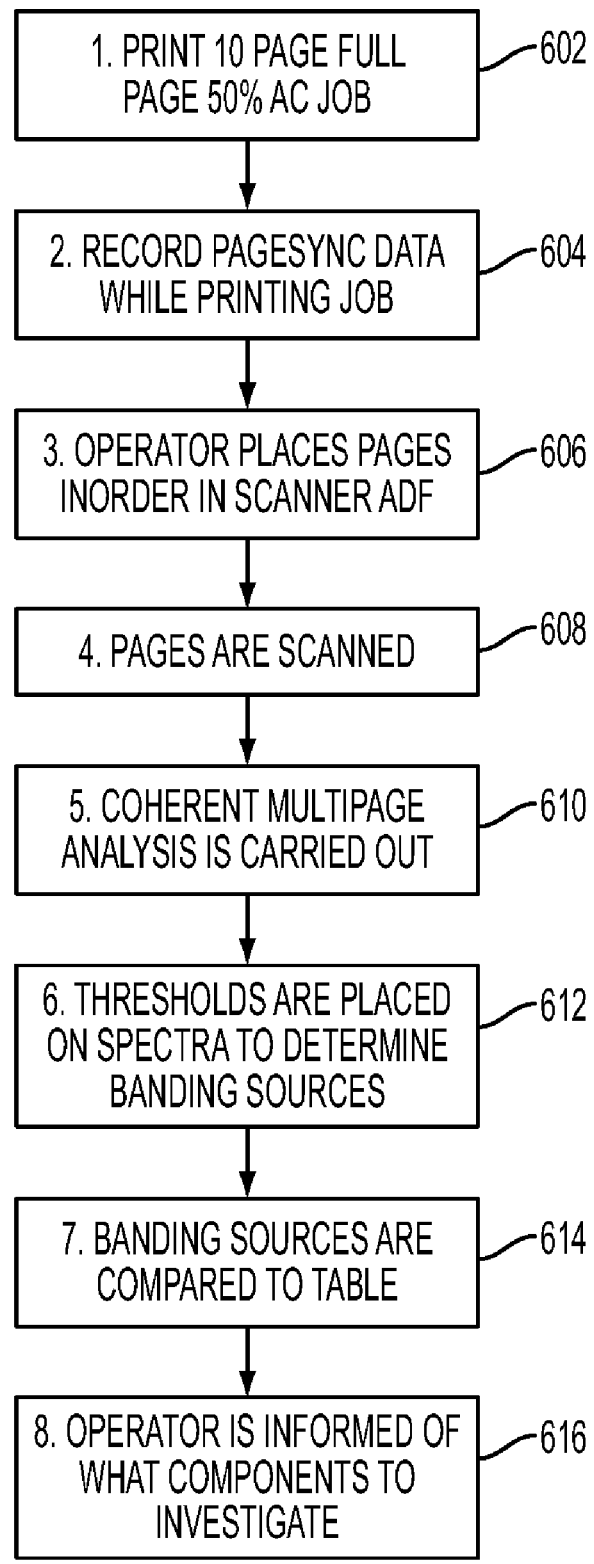
FIG. 6 illustrates an embodiment of a method for an automated banding diagnostic routine.

FIG. 6 illustrates an embodiment of a method for an automated banding diagnostic routine for multi-function printing devices, such as image printing system 102 (shown in FIG. 1). In step 602, ten (10) full pages at 50% area coverage are printed, by image printing system 102 for example. A similar automated diagnostic procedure may be used for devices with in situ sensors such as density sensors, full width arrays, or in-line spectrophotometers. In step 604, page synchronization data is recorded during the print job, by sensors 60 and/or 62 for example. The page synchronization data may be stored in memory 92. In step 606, an operator places pages in order in an image input device, such as a scanner Automatic Document Feeder (ADF). In step 608, pages are scanned. In step 610, least squares based coherent multipage analysis in accordance with the present disclosure is carried out on the scanned documents. In step 612, thresholds are placed on a banding profile to determine banding sources. In step 614, banding sources are compared to a table, such as Table 1. In step 616, the operator is informed on what components to investigate. For example, image printing system 102 (shown in FIG. 1) may generate a report for the operator. The report may be configured to inform an operator on what components to investigate Diagnostic routines may be performed on a regular basis or on operator direction. Steps 610 to 616 may be performed by a processor, such as processor 90, or a controller, such as controller 100, or a combination thereof Steps 610 to 616 may be stored as instructions on a machine-readable medium.

Figure 7:
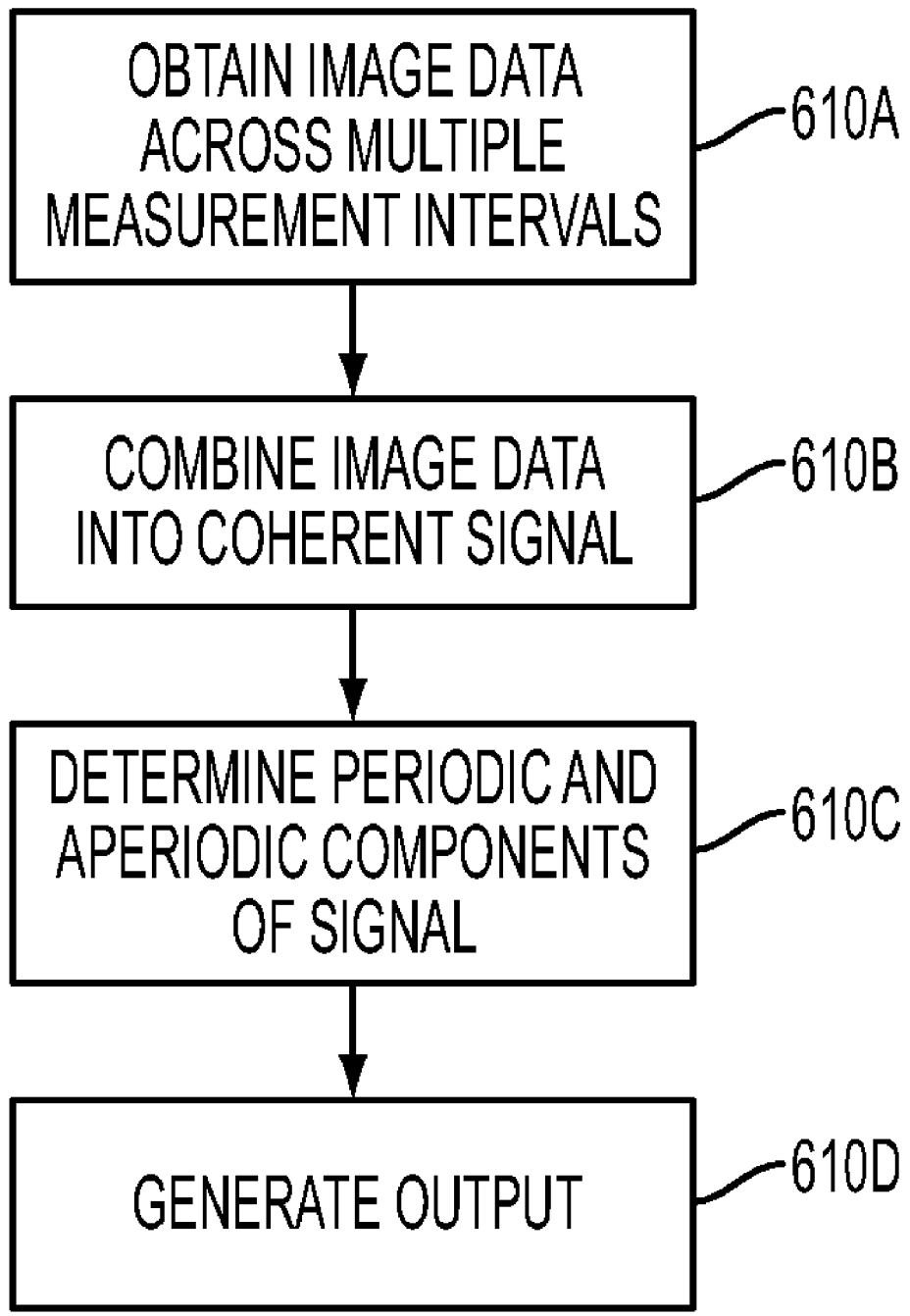
FIG. 7 illustrates an embodiment of a method for performing least squares based coherent multipage analysis.

FIG. 7 illustrates an embodiment of a method for performing least squares based coherent multipage analysis in accordance with the present disclosure. In step 610A, image data is obtained across multiple measurement intervals. The image data may be in the form of print profiles. The image data may be obtained from sensors 60 and/or 62 for example. In step 610B, the image data is combined with timing information into a coherent signal. The timing information may be the page synchronization data recorded in step 604. Processor 90 (shown in FIG. 1) may be configured to perform the step of combining the image data into the coherent signal. In step 610C, periodic and aperiodic components of the coherent signal are determined using least squares estimation, wherein the periodic component represents a banding profile. To determine the periodic and aperiodic components of the coherent signal using least squares estimation, periodic and aperiodic components may be modeled. The coefficients for the periodic and aperiodic may be determined using least squares based estimation methods, by processor 90, for example. Step 610D is an optional step where an output is generated. The output may be an output print with a correction applied based on the banding profile.

It should be appreciated that embodiments may be advantageously used in conjunction with controlling and/or modulating various actuators to apply a correction based on the banding profile in order to compensate for banding defects. For example, controller 100 (shown in FIG. 1) may be configured to modulate the power or intensity of exposing devices, as disclosed in U.S. patent application Ser. No.

12/555,287 filed on Sep. 8, 2009, herein incorporated by reference in its entirety. See also U.S. Pat. Nos. 7,492,381, 6,359,641, 5,818,507, 5,835,121, 5,659,414, 5,251,058, 5,165,074 and 4,400,740 and U.S. Patent Application Pub. No. 2003/0063183, each of which herein incorporated by reference in its entirety, for examples of methods and systems for modulating the power or intensity of exposing devices. Controller 100 (shown in FIG. 1) may also compensate for bands by controlling the current/voltage driven by charging device 12 (shown in FIG. 1), as disclosed in U.S. application Ser. No. 12/190,335 filed on Aug. 12, 2008. Controller may also be configured to digitally modify the image data content, as disclosed in U.S. Pat. Nos. 7,038,816 and 6,760,056 and U.S. Patent Application Pub. Nos. 2006/0077488, 2006/0077489, and 2007/0139733, each of which herein incorporated by reference in its entirety.

These embodiments may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety. In TIPP systems, each printer may have defects in one or more components and/or subsystems that cause banding. The banding profile for each printer may be estimated using least squares based coherent multipage analysis in accordance with the present disclosure.

Embodiments may be made in hardware, firmware, software, or various combinations thereof. The embodiments may also be implemented as instructions stored on a machine-readable medium, which may be read and executed using one or more processing devices. In one embodiment, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What we claim is:

1. A method for estimating a banding profile for an image printing system comprising at least one marking engine, the at least one marking engine comprising a charging device for charging the image bearing surface, an exposing device for irradiating and discharging the image bearing surface to form a latent image, and a developer unit for developing toner to the image bearing surface, the method comprising:
    obtaining image data across multiple measurement intervals by a sensor;
    combining the image data with timing information into a coherent signal by a processor; and
    determining periodic and aperiodic components of the coherent signal using least squares estimation by the processor,
    wherein the periodic component represents a banding profile; and
    wherein at least the periodic component is used to generate an output.

2. The method according to claim 1, wherein the output is a correction based on the banding profile, and wherein the method further comprises printing one or more measurement intervals using the correction.

3. The method according to claim 1, wherein the output is a report configured to inform an operator on what component(s) to investigate.

4. The method according to claim 1, further comprising identifying a banding source by referencing a look-up table by a controller.

5. The method according to claim 1, further comprising compensating for a banding defect by controlling and/or modulating one or more actuators.

6. The method according to claim 1, wherein the aperiodic components of the banding profile represent page-to-page drift variation and lead edge to trail edge variation.

7. The method according to claim 1, wherein the timing information comprises one or more page synchronization signals and/or one or more once-around signals from one or more banding sources.

8. The method according to claim 1, wherein said multiple measurement intervals are at least one of printed pages, inter-documents zones, and customer image zones.

9. A system for estimating a banding profile for an image printing system comprising:
    a marking engine;
    a sensor configured to obtain image data across multiple measurement intervals;
    an exposing device; and
    a processor configured to:
        combine the image data with timing information into a coherent signal, and
        determine periodic and aperiodic components of the coherent signal using least squares estimation,
        wherein the periodic component represents a banding profile.

10. The system according to claim 9, further comprising a controller configured to identify a banding source by referencing a look-up table.

11. The system according to claim 9, further comprising a controller configured to compensate for a banding defect by controlling and/or modulating one or more actuators.

12. The system according to claim 9, wherein the aperiodic components of the banding profile represent page-to-page drift variation and lead edge to trail edge variation.

13. The system according to claim 9, wherein the timing information comprises one or more page synchronization signals and/or one or more once around signals from one or more banding sources.

14. The system according to claim 9, wherein said multiple measurement intervals are at least one of printed pages, inter-documents zones, and customer image zones.

15. A computer program product, comprising a non-transitory machine-readable medium having a machine-readable program embodied therein, said machine-readable program, when executed by a processor, is adapted to implement a method estimating a banding profile for an image printing system, said method comprising:
- obtaining image data of images scanned across multiple measurement intervals by a sensor;
- combining the image data into a coherent signal by the processor; and
- determining periodic and aperiodic components of the coherent signal using least squares estimation by the processor, wherein the periodic component represents a banding profile.

16. The computer program product according to claim 15, further comprising identifying a banding source by referencing a look-up table.

17. The computer program product according to claim 15, further comprising compensating for a banding defect by controlling and/or modulating one or more actuators.

18. The computer program product according to claim 15, wherein the aperiodic components of the banding profile represent page-to-page drift variation and lead edge to trail edge variation.

19. The computer program product according to claim 15, wherein the timing information comprises one or more page synchronization signals and/or one or more once around signals from one or more banding sources.

20. The computer program according to claim 15, wherein said multiple measurement intervals are printed pages, inter-documents zones, and/or customer image zones.

* * * * *